(12) United States Patent
Huang et al.

(10) Patent No.: US 6,309,071 B1
(45) Date of Patent: Oct. 30, 2001

(54) LIQUID CRYSTAL PROJECTION DISPLAY SYSTEM

(75) Inventors: Austin L. Huang, Vancouver, WA (US); James M. Florence, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/366,943

(22) Filed: Aug. 4, 1999

(51) Int. Cl.[7] .................................................. G03B 21/14
(52) U.S. Cl. .................................................. 353/31; 353/20
(58) Field of Search ......................... 353/8, 20, 31, 353/84; 349/9, 8; 348/742, 743

(56) References Cited

U.S. PATENT DOCUMENTS

| | | |
|---|---|---|
| 4,124,278 | 11/1978 | Grinberg et al. . |
| 4,127,322 * | 11/1978 | Jacobson et al. ...................... 353/31 |
| 4,647,966 | 3/1987 | Phillips et al. . |
| 5,115,305 | 5/1992 | Baur et al. . |
| 5,172,254 | 12/1992 | Atarashi et al. . |
| 5,374,968 * | 12/1994 | Haven et al. ........................... 353/31 |
| 5,517,340 | 5/1996 | Doany et al. . |
| 5,534,949 | 7/1996 | Baron . |
| 5,552,840 | 9/1996 | Ishii et al. . |
| 5,575,548 * | 11/1996 | Lee ......................................... 353/31 |
| 5,612,753 | 3/1997 | Poradish et al. . |
| 5,668,572 | 9/1997 | Meyer et al. . |
| 5,680,180 | 10/1997 | Huang . |
| 6,113,239 * | 9/2000 | Sampsell et al. ...................... 353/20 |
| 6,183,091 * | 2/2001 | Johnson et al. ........................ 353/20 |

\* cited by examiner

*Primary Examiner*—William Dowling
(74) *Attorney, Agent, or Firm*—Chernoff, Vilhauer, McClung & Stenzel, LLP

(57) ABSTRACT

A projection display system comprises a light source that generates non-polarized light having at least two polarization states and having a first color component, a second color component, and a third color component. At least one color selection device selectively transmits at different times one of the second and third color components. The system has at least four polarized light modulators, two of the light modulators each generating a respective image associated with each respective polarization state of the first color component, and two of the light modulators each generating a respective image associated with a respective polarization state of one of the second and third color components transmitted by the color selection device. The system also has a projection lens for projecting the images from the polarized light modulators. Alternative projection display systems are disclosed, together with a method for projecting color images.

23 Claims, 3 Drawing Sheets

LIQUID CRYSTAL PROJECTION DISPLAY SYSTEM

BACKGROUND OF THE INVENTION

This invention relates to projection display systems which use reflective spatial light modulators, and more specifically, to such systems which use two polarization states of light to produce color images.

The system shown in FIG. 1 illustrates the essential components of the optical portion of a conventional projection display system having three reflective spatial light modulators in the form of liquid crystal display (LCD) panels, also known as liquid crystal light valves (LCLV). The prior art system, depicted generally at 10 includes a light source 12, an illumination mechanism for collecting the light and concentrating it onto the light valves, shown generally at 14, a polarizing mechanism for polarizing the light, if the light valves modulate via polarization effects, shown generally at 16, a splitting mechanism for splitting the illumination into three color bands to separately illuminate the three light valves, shown generally at 18, a recombining mechanism for recombining the three light distributions after reflecting from the light valves, shown generally at 20, and a projection mechanism for projecting the combined images onto a viewing screen, shown generally at 22.

Lamp 24 and lamp reflector 26 produce and concentrate the light for this system. A series of dichroic filters 28, 30 is used to split the light from the lamp 24 into separate red, green, and blue components. The light in each of the three components, or channels, is then polarized with a polarizing beam splitter (PBS) 32, 34, 36, and illuminates three separate LCDs, 38, 40, 42. The LCDs selectively modify the polarization of the light reflected from them allowing some portion of the light to pass back through the PBS. A second series of dichroic filters, 44, 46, is used to recombine the modulated light distributions and pass them on to a projection lens 48 imaging all three LCDs onto the viewing screen.

The configuration shown in FIG. 1 is functional and has been used to implement projection display system products. However, one drawback of such systems is that they are inefficient, utilizing only one half of the light from the light source. This is a particular problem since the displays tend to be dim and it is desired to produce bright images using such displays. Polarization converters have been used to improve optical throughput by converting the randomly polarized light from a light source to a single polarization state. However, such polarization converters are not entirely efficient and can introduce depolarization effects that can effect contrast, and also add additional complexity and cost.

Another drawback of such systems is that color balance is often sacrificed to improve brightness of the projected image. For color displays, one aspect of picture quality is color temperature. This is a subjective evaluation, indicated by the "whiteness" of white. It is assumed by analogy to the photographic film industry that color temperature preferences follow certain geographic patterns. For example, Americans seem to prefer a bluish white color temperature, while Europeans seem to prefer whatever color temperature provides a "truest" skin tone. It is desirable for a color display system to be able to provide whatever color temperature is preferred in a given market. Color balance has been achieved conventionally by providing additional filtering to decrease the intensity of particular color components, thus correcting any imbalance in the light source. However, because image brightness is already a problem in conventional display systems, it is often undesirable to further decrease brightness in order to achieve a more desirable color temperature.

Yet another drawback of the prior art projection display systems is that the large number of components in the architecture shown in FIG. 1 is cumbersome, and necessitates a relatively large physical size of the system. Still another drawback to these systems is the requirement of a large back working distance for the projection lens.

The prior art projection display systems which have sought to provide full color images have not adequately addressed these drawbacks. Accordingly, there is still a need for a color projection display that efficiently transmits light of both polarization states through the projection display system to yield a bright image, that achieves the desired color temperature but that does not suffer from depolarization effects, that utilizes a small number of components in a small physical size of, the system, and that has a relatively short back working distance for the projection lens.

SUMMARY OF THE INVENTION

The present invention overcomes the drawbacks of the prior art by providing in a first aspect a projection display system comprising a light source that generates light having at least two polarization states and having at least a first color component, a second color component, and a third color component. The system has at least one color component selection device that selectively transmits at different times one of the second and third color components. The system has at least four polarized light modulators. Two of the light modulators each generate a respective image associated with each respective polarization state of the first color component. The other two light modulators each generate a respective image associated with each respective polarization state of one of the second and the third color components transmitted by the color component selection device. The system also has a projection lens for projecting the images from the polarized light modulators.

In a second separate aspect of the invention, a projection display system comprises a light source that generates non-polarized light having at least three color components. A color selection device selectively transmits different color components at different times. A polarization separator has a first optical path for light of a first polarization state and a second optical path for light of a second polarization state. Each of the optical paths produces respective images for each of the three color components. A projection lens projects the images.

In another separate aspect of the invention, a method is provided for displaying color images. First, light is generated having at least two polarization states and at least three color components. The second and third color components are selectively transmitted at different times. Respective images associated with each of the respective polarization states of the first color component are generated. Respective images associated with the respective polarization states of the second and third color components are generated at different times. The images are then projected through a projection lens.

The various aspects of the invention have one or more of the following advantages. The projection display system has the advantage of increased optical efficiency (i.e., brighter output) by utilizing both polarization states of the incident light. Thus, the system provides a brighter projected image by improving the optical transmission from a single light source. In addition, this system will have no depolarization effects caused by a polarization converter, which can effect optical throughput and cause a reduction in contrast. Another advantage of the invention is that a light source not necessarily having the desired color temperature can be used. This permits the light source to be selected on the basis of factors other than color temperature, such as heat, size, cost, and total light output intensity. Yet another advantage of the invention is that color temperature may be customized for different markets. In general, the desired color temperature may be achieved by determining the amount of time during which different color components are transmitted through the projection display system. In addition, the display system may be manufactured to have a relatively small physical size, and also to have a relatively short back working distance for the projection lens.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

The present invention simultaneously uses both polarization states of light from a light source to reconstruct an image by time modulating two color components of light onto two LCD's while continuously illuminating two additional LCD's with a third color component. One advantage of this invention is that it uses both polarization components of the white light produced by the light source (i.e., random or natural light) in order to produce the image. The use of both polarization states of light increases the optical efficiency of the system leading to a brighter output.

Figure 1:
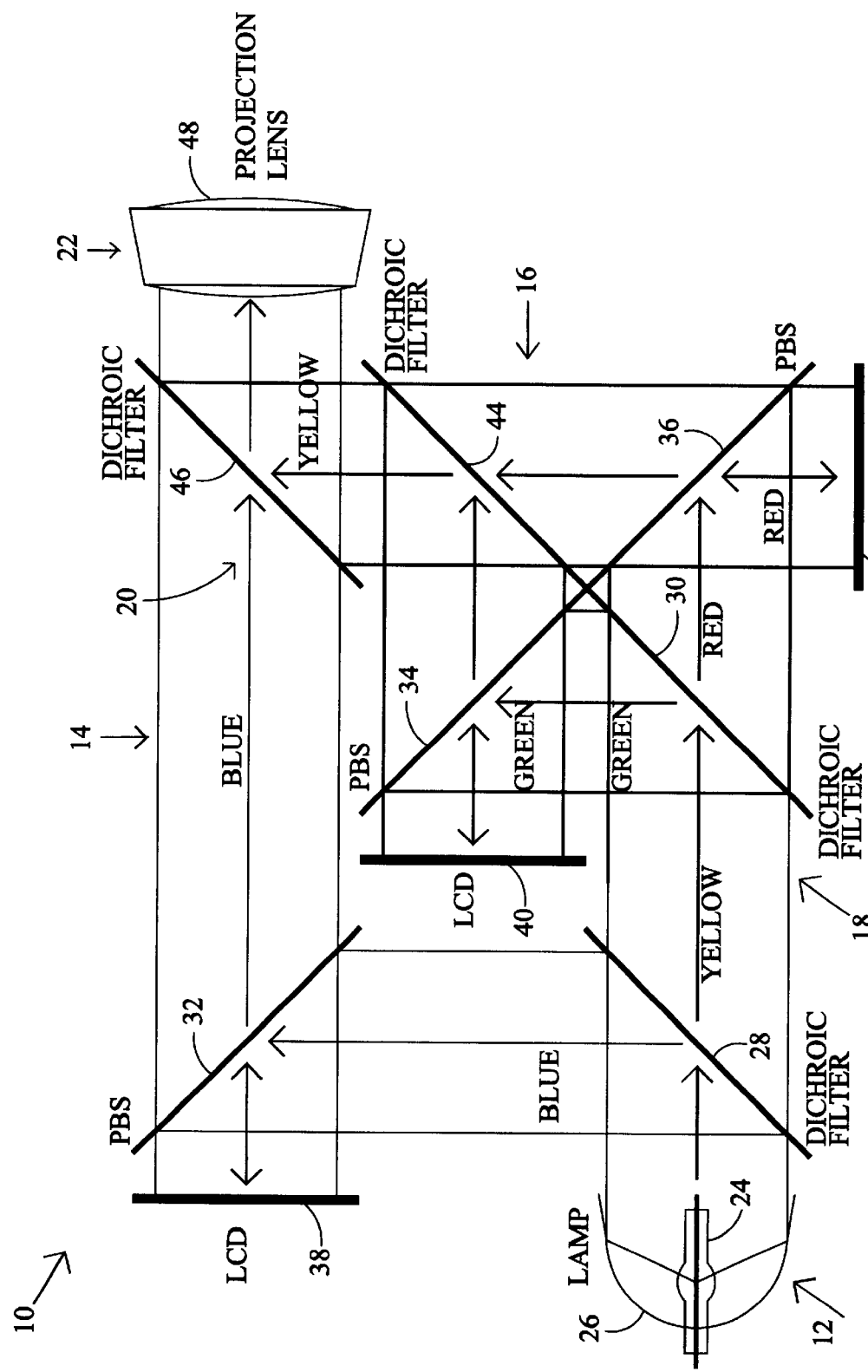
FIG. 1 shows a schematic representation of a prior art projection display system.
Figure 2:
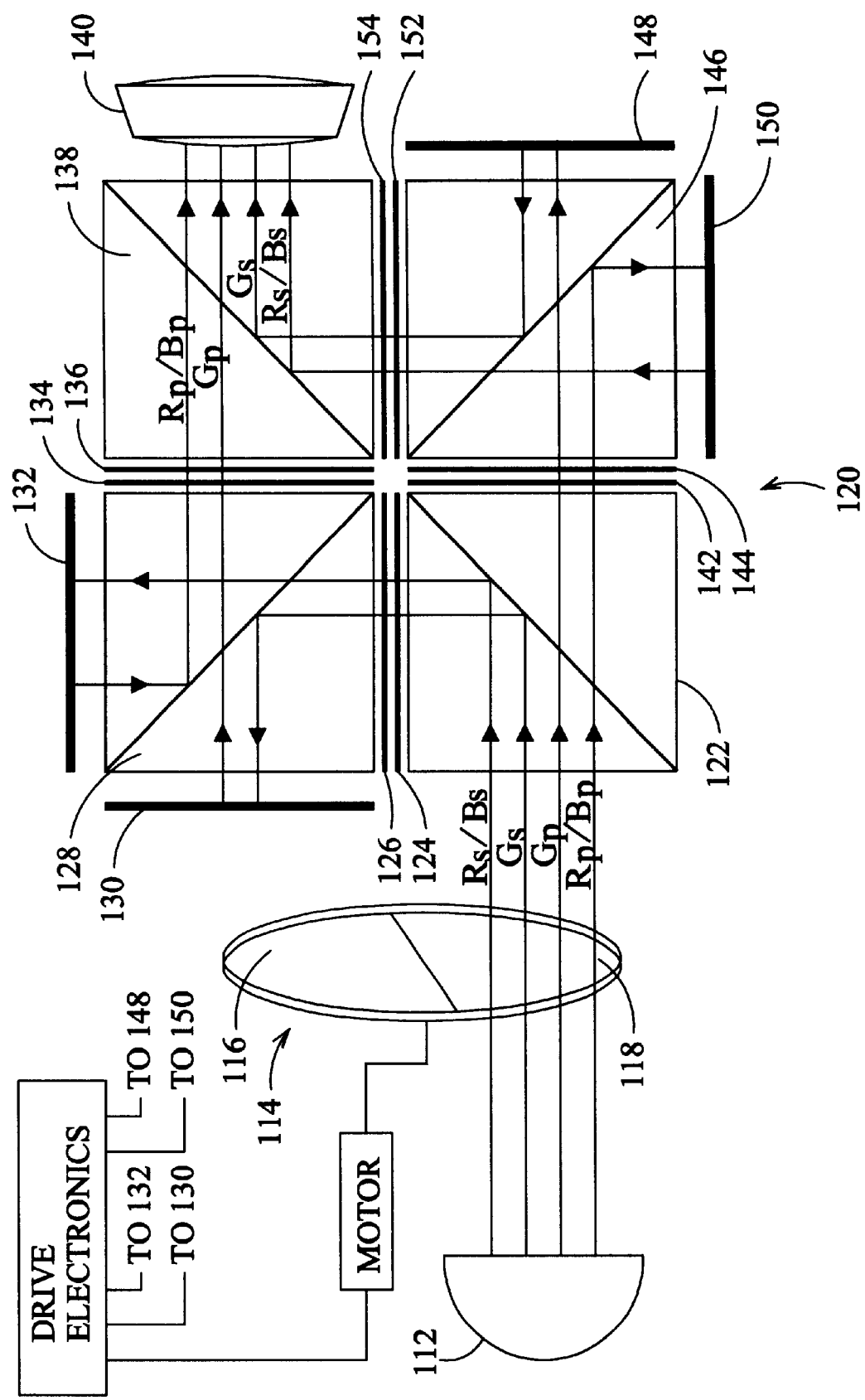
FIG. 2 is a schematic representation of the optical path of the projection system of the present invention.

Referring now to the figures, wherein like numerals refer to like elements, FIG. 2 shows a projection display system 110 having light source 112 for producing randomly polarized white light. A rotating color wheel 114 separates the white light into different color components by transmitting different color components at different selected times. As used herein, a color component refers to a different color or spectral bandwidth, such as red, blue or green light components. It is to be understood that any set of wavelength ranges may be used for the color components, as desired. The wavelength ranges of the different color components may or may not overlap one another. Also, any number of color components may likewise be used, as desired. The color wheel 114 is divided into different segments, each segment transmitting and filtering different color components so that as the color wheel 114 rotates, different color components are transmitted at different times. In the embodiment shown in FIG. 2, the color wheel 114 is divided into two different segments: a yellow (green and red) section 116, and cyan (green and blue) section 118. The color wheel 114 rotates so that as white light passes through the color wheel 114, the green color component will always be transmitted through both of color segments 116 and 118. However, the red color component will only pass through the color wheel 114 through the yellow segment 116, while the blue color component will only pass through the color wheel 114 through the cyan segment 118. Accordingly, the color wheel 114 modulates at least two of the color components by time. The output through the color wheel 114 is not polarized.

The light passing through the color wheel 114 then enters a polarization separator 120 that takes the randomly polarized white light and separates the light such that one polarization component of the light will be directed in one optical path while the other polarization component will travel in another optical path. The different polarization states are preferably at 90° orientations, such as "s" and "p" linearly orthogonal polarization states, but may be at any other suitable angle or relationship, as desired. Also, right- and left-handed circular polarization states may be used.

In the embodiment shown in FIG. 2, a polarizing beam splitter 122 divides the light into two polarization components, reflecting the s component while transmitting the p component. Referring now to the path traveled by the s component, the polarizing beam splitter 122 reflects all color components having s polarization through a polarizer 124 which transmits only s polarized light. The function of the polarizer 124 is to improve the contrast of the system by eliminating light not having the desired polarization component that may have been incidentally reflected from polarizing beam splitter 122.

The light then travels through a selective color component rotator 126. The selective color component rotator 126 rotates the polarization of the color components corresponding to the two color components which have been time modulated by the color wheel 114. That is, the color component rotator is a wavelength specific $\lambda/2$ plate. For example, in the system shown in FIG. 2, the color component rotator 126 is a red/blue rotator, which rotates the polarization state of the red and blue color components from an s polarization state to a p polarization state. Color component rotators, which rotate only certain wavelengths, or color component(s) of light, may be obtained from Color Link in Boulder, Colorado or Cambridge Research and Instrumentation in Cambridge, Mass. Of course, in other embodiments the color component rotator could rotate only a single color component, such as the green color component, rather than the two time modulated color components as illustrated in FIG. 2.

The three color components then enter a polarizing beam splitter 128 that again reflects light in the s polarization state while transmitting light in the p polarization state. At this juncture, in the embodiment shown in FIG. 2, only the green color component is in the s polarization state, while the red and blue color components are in the p polarization state. The green light reflecting off of the polarizing beam splitter 128 is imaged using the reflective LCD panel 130. The reflected green component image is in the p polarization state, and is then transmitted through polarizing beam splitter 128. Similarly, the red and blue color components are transmitted through polarizing beam splitter 128 to the reflective LCD panel 132, which produces the blue and red images. The reflected blue and red color component images are in the s polarization state, which are then reflected by the polarizing beam splitter 128. Because the reflective LCD panels rotate the polarization state of the incident light, the drive electronics produce grey-level through polarization modulation. The reflective LCD drive electronics are synchronized to the rotation rate of the color wheel 114 and are designed to multiplex one of the LCD panels (e.g. the red/blue LCD panels 132) to a frame rate twice that of the other (e.g. the green LCD panel 130). For one cycle, or one complete rotation of the color wheel 114, the drive electronics produce a single image using LCD panel 130 to produce the green color component image. During the same cycle, the drive electronics produce a red image using the LCD panel 132 when the red color component is transmitted by the color wheel 114, and produce a blue image using the LCD panel 132 when the blue color component is transmitted by the color wheel 114.

The respective images produced by the reflective LCD panels 130 and 132 are transmitted through another selective color component rotator 134, which, like rotator 126, rotates the polarization state of the modulated color components so that the three color components again have the same polarization state. The light then passes through an analyzer 136, which like the polarizer 124 is another polarization filter used to filter out the undesired polarization components and is useful for image contrast. The three color components then are transmitted through polarizing beam splitter 138 to projection lens 140, which then projects the respective images.

Returning to polarizing beam splitter 122, the light in the p polarization state transmitted through polarizing beam splitter 122 travels on a similar optical path. The three color components travel through a polarizer 142 and a selective color component rotator 144 so that the light is divided such that the color component always transmitted by color wheel 114 is in one polarization state while the color components which are modulated by the color wheel 114 are in another polarization state. As shown in FIG. 2, the green color component is in the p polarization state, while the red and blue color components are in the s polarization state. Polarizing beam splitter 146 transmits the green color component in the p polarization state while reflecting the red and blue color components in the s polarization state. Thus, the green color component is transmitted to the reflective LCD panel 148 while the red and blue color components are reflected toward the reflective LCD panel 150. The images reflected from the LCD panels 148 and 150 are directed by the polarizing beam splitter 146 to the color component rotator 152 and analyzer 154, and then into polarizing beam splitter 138. Again, color component rotator 152 rotates the polarization state of the modulated color components, while analyzer 154 filters out light which is not in the desired polarization state.

Each polarization state, and consequently each optical path of separator 120, contains all of the color information (i.e., red, blue, and green color components). Each optical path of the separator 120 can independently produce an image, but since the two optical paths together utilize both polarization states, the present invention produces a brighter image as well as obtains a higher polarization utilization factor.

Figure 3:
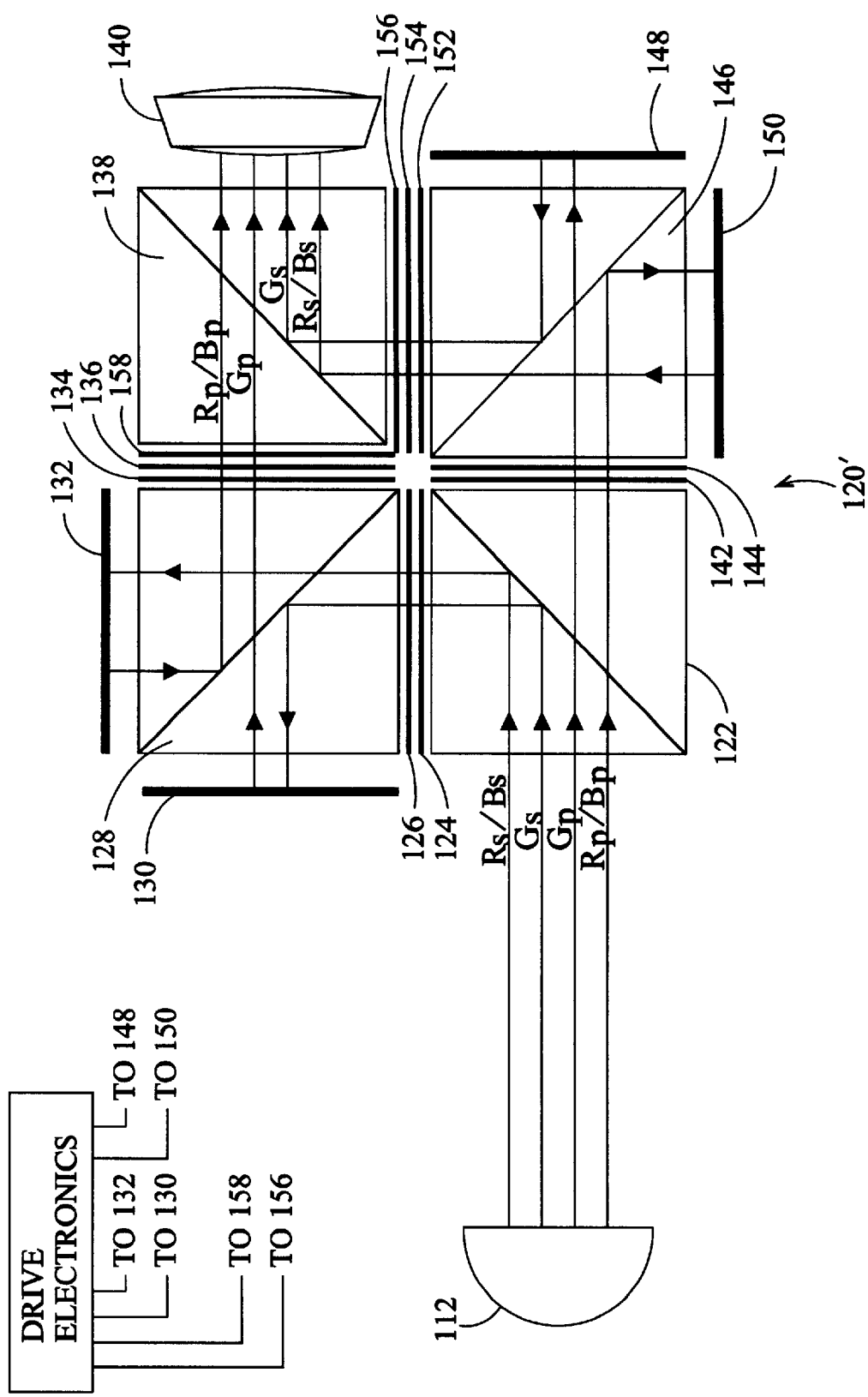
FIG. 3 is a schematic representation of the optical path of an alternative embodiment of the projection system of the present invention.

FIG. 3 shows an alternative embodiment in which an electrical, non-mechanical method for constantly transmitting one color component while modulating the two other color components is provided. Instead of using a color wheel to transmit cyan (the green and blue color components) or yellow (the green and red color components) to the input of the separator 120', an alternative method uses electrically addressable, polarization selective color filter switches 156 and 158 in the separator 120'. Such devices are available from Color Link in Boulder, Colo., Cambridge Research and Instrumentation in Cambridge, Mass., and Displaytech, Inc. located in Longmont, Colo. Separator 120' is identical to the separator 120 of FIG. 2 except for the addition of optical switches 156 and 158. Each optical switch 156 and 158, with the appropriate linear polarizers, selectively transmits different color components at different times. The optical switches 156, 158 are synchronized to the LCD panels so that the switches 156, 158 transmit the color components corresponding to the color component images produced by the LCD panels. In the embodiment shown in FIG. 3, optical switches 156, 158 transmit either yellow or cyan wavelengths and are synchronized to transmit yellow (the green and red color components) when the blue/red LCDs 132 and 150 display red information and switched to transmit cyan (green and blue) when the blue/red LCDs 132 and 150 display blue information. Thus, the optical switches 156 and 158 allow continuous transmission of the green color component while time modulating the red and blue color components.

For each of the embodiments described herein, the choice of modulating the blue and red color components and continuously transmitting the green color component was selected for exemplary purposes. Any other combination of colors/wavelengths is equally valid for this optical approach. The decision to use a mechanical system (as in FIG. 2) or an electro-optical system (as in FIG. 3) will be governed by performance issues and product design considerations.

The present invention has the significant advantage of allowing optimization of the color temperature as well as the improved light efficiency of the projection display system. Color balance may be achieved by varying the amount of time each color component is transmitted relative to the other color components. Thus, different color components may be displayed for different lengths of time. For a light source that is deficient in one color component, the system may continuously transmit that color component while time modulating the two other color components. For example, in the system shown in FIG. 2, if the light source is deficient in the green color component, the system can provide a more pleasing color temperature by transmitting the green color component continuously while modulating the red and blue color components. Additionally, other adjustments may be made by varying the areas of the segments 116 and 118 of the color wheel 114. For example, it may be desirable to achieve a more pleasing color temperature by increasing the amount of the red color component relative to the blue color component. This may be achieved by increasing the area of the yellow segment 116 and decreasing the area of the cyan segment 118, and by adjusting the drive electronics for the LCD panels 132, 150, accordingly, to synchronize the LCD panels to the transmission of the various color components. Thus, by adjusting the relative areas of the segments 116 and 118, the color temperature may be adjusted. Moreover, additional filter segments could be added to the color wheel 114 to transmit only one color component at a particular time, or no light, to provide for further adjustments.

With respect to the embodiment shown in FIG. 3, color balance may be achieved by adjusting the electrical drives for the optical switches 156, 158 so that the optical switches 156, 158 transmit one of the color components for a longer period of time than another color component. For example, the optical switches 156, 158 may transmit the red color component for a longer period of time,than the blue color component. The drive electronics for LCD panels 132, 150 are adjusted accordingly to produce red and blue images when the red and blue color components are being transmitted. By manipulating the relative amount of time during which the different color components are transmitted, and adjusting the drive electronics of the LCD panels accordingly, the desired color balance may be achieved.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A projection display system comprising:
   (a) a light source that generates generally non-polarized light having a first color component, a second color component, and a third color component;
   (b) at least one color selection device that selectively transmits at different times one of said first and second color components, and said first and third color components;
   (c) at least two pair of polarized light modulators, one of said pair of light modulators generating respective images associated with respective polarization states of said first color component, and the other of said pair of light modulators generating respective images associated with respective polarization states of one of said second and third color components in cooperation with said at least one color selection device; and
   (d) a projection lens for projecting said images from said polarized light modulators.

2. The projection display system of claim 1 wherein a portion of one of said color components overlaps a portion of another of said color components.

3. The projection display system of claim 1 wherein each of said color components is free from overlapping another of said color components.

4. The projection display system of claim 1 wherein said color selection device is a color wheel.

5. The projection display system of claim 1 wherein said color selection device is an optical switch.

6. The projection display system of claim 1, further comprising a selective color component rotator, said color component rotator being located at at least one of (1) between said light source and said at least two pair of polarized light modulators and (2) between said at least two pair of polarized light modulators and said projection lens.

7. The projection display system of claim 1 wherein said color selection device transmits said second color component for a first time period, said color selection device transmits said third color component for a second time period, and said first time period is different than said second time period.

8. The projection display system of claim 1, further comprising drive electronics synchronized to said color selection device.

9. The projection display system of claim 8 wherein said drive electronics drives said two pair of polarized light modulators at different respective frame rates.

10. A projection display system comprising:
    (a) a light source that generates non-polarized light having at least a first color component and a second color component;
    (b) at least one color selection device that selectively transmits at different times said second color component and said at least one color selection device transmits said first color component;
    (c) at least four polarized light modulators, two of said light modulators each generating a respective image associated with a respective polarization state of said first color component, and two of said light modulators each generating a respective image associated with a respective polarization state of said second color component; and
    (d) a projection lens for projecting said images from said polarized light modulators.

11. The projection display device of claim 10 wherein said color selection device is a color wheel.

12. The projection display system of claim 10 wherein said color selection device is an optical switch.

13. The projection display device of claim 10, further comprising a selective color component rotator, said color component rotator being located at at least one of (1) between said light source and said at least two pair of polarized light modulators and (2) between said at least two pair of polarized light modulators and said projection lens.

14. A projection display system, comprising:
    (a) a light source that generates non-polarized light having a plurality of color components;
    (b) a color selection device that selectively transmits different ones of said plurality of color components at different times;
    (c) a polarization separator having a first optical path for light based upon the combination of at least the color of the light and a first polarization state of the light and a second optical path for light based upon the combination of at least the color of the light and a second polarization state of the light, each of said optical paths producing respective images for each of said plurality of color components; and (d) a projection lens for projecting said images.

15. The projection display system of claim 14 wherein said color selection device is a color wheel.

16. The projection display system of claim 14 wherein said color selection device is an optical switch.

17. The projection display device of claim 14 wherein each optical path further comprises a selective color component rotator, said color component rotator being located at at least one of (1) between said light source and said at least two pair of polarized light modulators and (2) between said at least two pair of polarized light modulators and said projection lens.

18. The projection display system of claim 14 wherein each optical path further comprises a plurality of polarized light modulators.

19. A method for projecting color images, comprising:

(a) generating light that has at least two polarization states and a first color component, a second color component, and a third color component;

(b) selectively transmitting at different times said second and third color components, and transmitting said first color component;

(c) generating a respective image associated with each respective polarization state of said first color component, and generating at different times a respective image associated with each respective polarization state of said second and third color components simultaneously with at least one of said respective image associated with each respective polarization state of said first color component; and (d) projecting said images through a projection lens.

20. The method of claim 19 wherein light of a first polarization state is transmitted along a first optical path and light from a second polarization state is transmitted along a second optical path.

21. The method of claim 19, further comprising the step of selectively changing one color component from a first polarization state to a second polarization state while maintaining another color component in said first polarization state.

22. The method of claim 19 wherein a color wheel selectively transmits said second and third color components.

23. The method of claim 19 wherein an optical switch selectively transmits said second and third color components.

\* \* \* \* \*